United States Patent [19]

Nozaki

[11] 4,320,180

[45] Mar. 16, 1982

[54] FUEL CELL

[75] Inventor: Ken Nozaki, Tokyo, Japan

[73] Assignees: Agency of Industrial Science and Technology; Ministry of International Trade and Industry, both of Tokyo, Japan

[21] Appl. No.: 196,188

[22] Filed: Oct. 14, 1980

[30] Foreign Application Priority Data

Oct. 19, 1979 [JP] Japan .................... 54-134210

[51] Int. Cl.³ .................................. H01M 8/18
[52] U.S. Cl. ..................... 429/20; 429/107
[58] Field of Search .................... 429/19–21, 429/15, 107, 101, 46

[56] References Cited

U.S. PATENT DOCUMENTS 3,920,474 11/1975 Zito, Jr. ..................... 429/15
4,069,371 1/1978 Zito ....................... 429/21
4,159,366 6/1979 Thaller .................. 429/19 X Primary Examiner—Charles F. LeFevour
Attorney, Agent, or Firm—Kurt Kelman

[57] ABSTRACT

A fuel cell using hydrogen sulfide as the fuel therefor, wherein the electrolytic cell is divided by a diaphragm into a positive electrode chamber and a negative electrode chamber, which fuel cell is operated by feeding a redox solution as the negative electrolyte to the negative electrode chamber, withdrawing from the electrolytic cell the redox solution which has been oxidized by reaction with the negative electrode, removing from the negative electrode chamber the sulfur produced by contact with hydrogen sulfide, and circulating to the negative electrode chamber only the redox solution which has been reduced by contact with hydrogen sulfide.

6 Claims, 1 Drawing Figure

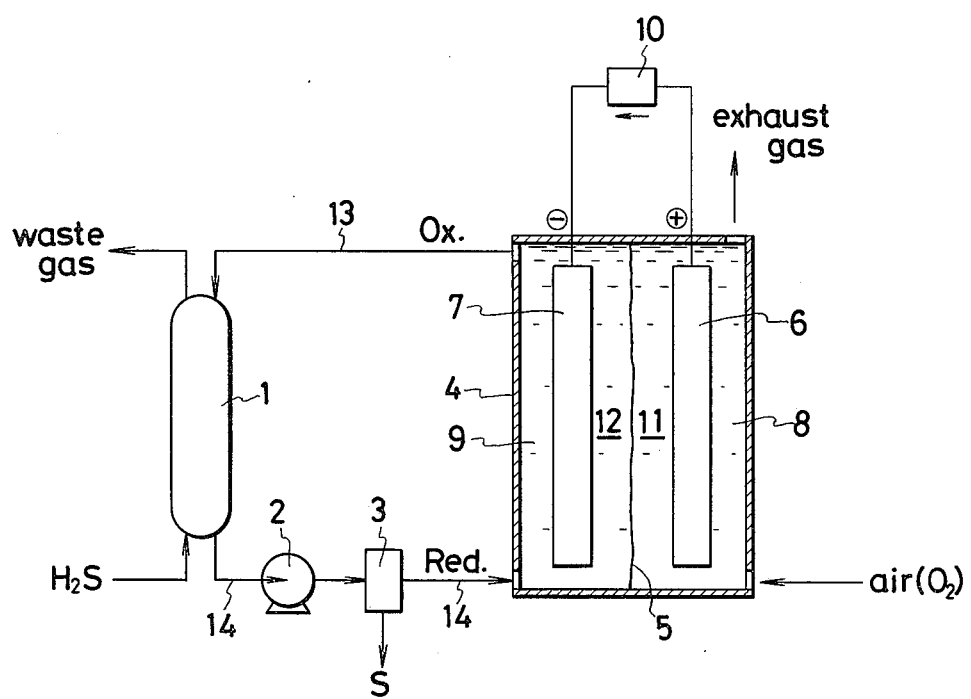

FUEL CELL

BACKGROUND OF THE INVENTION

This invention relates to a fuel cell, and more particularly to a fuel cell of the type which uses hydrogen sulfide or hydrogen gas containing hydrogen sulfide as its fuel.

In most oil refineries, heavy oil and other similar fractions are desulfurized for the purpose of preventing environmental pollution. The desulfurizing process generates hydrogen sulfide. Also in the processes for gasification or liquefaction of coal, hydrogen sulfide occurs as a secondary product. The hydrogen sulfide which issues as a by-product in these processes must be disposed of. As methods of disposal, various wet oxidation processes have been proposed wherein a gas containing hydrogen sulfide is brought into contact with a liquid catalytic composition so as to convert the hydrogen sulfide into elementary sulfur (hereinafter referred to simply as "sulfur"). This process involves a reaction represented by the formula (1) shown below.

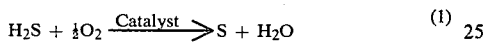
$$H_2S + \tfrac{1}{2}O_2 \xrightarrow{\text{Catalyst}} S + H_2O \qquad (1)$$

This is an exothermic reaction ($\Delta H = -63.5$ Kcal/mol) comparable in magnitude of heat evolution to the combustion of hydrogen ($\Delta H = -68.3$ Kcal/mol). In the desulfurization of a large amount of crude oil, the thermal energy liberated by this exothermic reaction reaches a level too high to be negligible. A standard desulfurization system, for example possesses a capacity for treating about 60,000 barrels/day of heavy oil and by-produces about 200 tons/day of hydrogen sulfide. From a theoretical point of view it should be possible to advantageously utilize this by-produced hydrogen sulfide as the fuel for a fuel cell since the standard oxidation-reduction potentials of hydrogen sulfide and its ions ($S^{2-}$) are $+0.14$ volt and $-0.48$ volt and they differ from the potential, $+1.23$ volt, of hydrogen invariably by more than 1 volt. When hydrogen sulfide is made to react on the gas electrode as in the ordinary fuel cell, however, the catalyst for the fuel cell is poisoned by hydrogen sulfide and the sulfur formed by the reaction of the aforementioned formula (1) is deposited on the negative electrode on the fuel side and inseparably retained there. In the fuel cell which uses, as the fuel therefor, a substance containing hydrogen sulfide even in a very small amount, therefore, it is imperative that special consideration should be paid to the negative electrode.

SUMMARY OF THE INVENTION

An object of this invention is to provide a fuel cell which is capable of reclaiming electric energy from hydrogen sulfide which otherwise remains as a noxious industrial waste.

To accomplish the object described above according to the present invention, there is provided a fuel cell wherein the positive electrode and the negative electrode of the electrolytic cell are separated from each other by an interposed diaphragm and a negative electrolyte is fed to the negative electrode, which fuel cell is characterized by feeding a redox solution as the negative electrolyte, removing from the electrolytic cell the redox solution which has been oxidized through a reaction with the negative electrode, bringing the oxidized redox solution into contact with hydrogen sulfide to thereby reduce the redox solution and simultaneously produce elementary sulfur, separating the sulfur from the reduced redox solution, and circulating back to the negative electrode chamber the reduced redox solution.

In the fuel cell of the present invention, a redox solution is used as the negative electrolyte, the oxidized negative electrolyte is subjected to reduction outside the electrolytic cell by use of hydrogen sulfide, and the formed sulfur is removed from the reduced negative electrolyte and consequently is prevented from entering the electrolytic cell. The fuel cell, therefore, permits hydrogen sulfide to be advantageously utilized as an electrode without entailing accumulation of sulfur within the electrolytic cell or exposing the electrode catalyst to the danger of poisoning.

The other objects and characteristics of the present invention will become apparent from the further disclosure of the invention to be made hereinafter with reference to the accompanying drawing.

BRIEF EXPLANATION OF THE DRAWING

The drawing is an explanatory diagram illustrating in cross section a part of the fuel cell according to the present invention.

DESCRIPTION OF PREFERRED EMBODIMENT

When hydrogen sulfide or a gas containing hydrogen sulfide is used as the fuel in a fuel cell, the electrode catalyst of the fuel cell is poisoned by the hydrogen sulfide and sulfur accumulates within the fuel cell. Thus, hydrogen sulfide makes a poor fuel for the fuel cell.

In the fuel cell, the negative electrolyte on the negative electrode side is oxidized through a reaction with the fuel substance in the presence of the electrode catalyst. It has now been found that by adopting, as the negative electrolyte, a redox solution which, on being oxidized, is reduced through a reaction with hydrogen sulfide and by incorporating in the fuel cell separate means adapted to separate the formed sulfur from the electrolyte, hydrogen sulfide can be advantageously utilized as the fuel for the fuel cell. The present invention has been perfected on the basis of this knowledge.

The drawing illustrates one embodiment of the fuel cell according to the present invention. The interior of an electrolytic cell 4 is divided into two chambers 11, 12 by an interposed diaphragm 5. One of the chambers, 11, is filled with a positive electrolyte 8 and a positive electrode 6 is disposed within the positive electrolyte. The other chamber 12 is filled with a negative electrolyte 9, and a negative electrode 7 is disposed within the negative electrolyte. An external load 10 is connected between the positive electrode 6 and the negative electrode 7.

As the negative electrode described above, carbon cloth, carbon felt and porous carbon can be used, whereas Teflon-bonded carbon electrodes, etc. which have heretofore been known in the art can be used as the positive electrode. As the electrolytes, aqueous chloride solution, aqueous phosphoric acid solution, aqueous sulfate solution, etc. can be used. As the catalyst, platinum catalyst, Raney nickel catalyst and the like can be used.

A pipe 13 is laid in the upper portion of the negative chamber 12 of the electrolytic cell 4, with the outer end of the pipe 13 extended and connected to the upper side of an absorption reaction column 1. The lower side of the reaction column 1 is connected with a pipe 14 to the lower portion of the negative electrode chamber 12 via a pump 2 and a filter 3. In this arrangement, therefore, the negative electrolyte 9 is allowed to be circulated between the negative electrode chamber 12 and the absorption reaction column 1.

In the fuel cell constructed as described above, a redox solution is used as the negative electrolyte. The redox electrolyte in a reduced state reacts on the negative electrode 7 side and consequently assumes an oxidized state, and the oxidized redox electrolyte is forwarded to the absorption reaction column 1. Meanwhile, hydrogen sulfide or a gas containing hydrogen sulfide is fed upwardly into the absorption reaction column 1 through the lower end. Inside the absorption reaction column 1, hydrogen sulfide comes into counterflow contact with the negative electrolyte and reacts with the redox solution in the oxidized state as represented by the formula (2) given below, giving rise to a reduced redox solution containing sulfur.

$$H_2S + Ox. \rightarrow S + Red. + 2H^+ \qquad (2)$$

The negative electrolyte in the state indicated above is forwarded by a pump 2 to a filter 3 and, consequently, the sulfur is separated from the reduced electrolyte. The negative electrolyte 9 freed from sulfur and retained in the reduced state is fed to the negative electrode chamber 12, wherein the reactions shown below proceed at the negative electrode 7 and the positive electrode 6.

$$\text{Negative electrode: } Red. + 2H^+ \rightarrow Ox. + 2e^- + 2H^+ \qquad (3)$$

$$\text{Positive electrode: } O_2 + 2H^+ + 2e^- \rightarrow H_2O \qquad (4)$$

In the formulas, "$e^-$" denotes an electron involved in the electrode reaction. Owing to the electron, an electric current flows from the positive electrode 6 to the negative electrode 7 and the fuel cell delivers an output to the external load 10. In the meantime, within the fuel cell, ions such as the $H^+$ move within the negative and positive electrolytes 8, 9 as the ionic charge carrier. On the positive electrode 6, water is formed by the reduction of oxygen in the air. The produced water is discharged mainly from the chamber 11 in the form of steam and released into the ambient air surrounding the fuel cell.

The absorption reaction described above and all the other reactions occurring on the positive and negative electrodes 6, 7 are summarized by the following formula (5).

$$H_2S + \tfrac{1}{2} \cdot O_2 \xrightarrow{\text{Fuel cell}} S + H_2O \qquad (5)$$

This reaction is equivalent to the reaction of the formula (1) involved in the aforementioned wet oxidation process which is aimed at recovering hydrogen sulfide in the form of sulfur. The two reaction differ only in respect that the former produces electric power instead of evolution of heat of the reaction.

For the purpose of the present invention, the redox solution must fulfill the requirement that it should produce sulfur by reacting with hydrogen sulfide in the absorption reaction column 1 and it should be readily regenerated by oxidation on the negative electrode 7. Examples of the redox solution include chelate complexes such as iron-ethylenediaminetetraacetate and iron-nitrilatriacetate. By using an aqueous iron chloride solution as the redox solution, there is derived an advantage that the absorption ratio of hydrogen sulfide and the current density are both high. Besides, iodine, naphthoquinone sulfonic acid, iron, citric acid, etc. which have been known as useful wet catalysts for hydrogen sulfide are also available for this purpose.

The sufficient working concentration for iron-edta or iron-nitrilotriacetate is within the range of 0.3 to 1 mol/liter and that for iron chloride is within the range of about 1 to 3 mol/liter.

As described above, in the system of this invention, there is no possibility of elementary sulfur adhering to the negative electrode and degrading the electrolytic cell's capacity for electric output because hydrogen sulfide is directly drawn into the electrolytic cell and, therefore, is prevented from coming into contact with the negative electrode.

The reaction of the oxidized negative electrolyte with hydrogen sulfide within the absorption reaction column proceeds advantageously at a pH value within the range of 3 to 8 at room temperature. Within the redox solution, sulfur is isolated in a solid form. With a filter of about 300 mesh, the solid sulfur can be substantially removed from the redox solution, and the sulfur still remaining in the solution does not interfere the function of the negative electrode. The number of the stages in the absorption reaction column is selected so that the effluent gas from the column does not contain any hydrogen sulfide of a concentration giving rise to environmental pollution.

The fuel cell illustrated in the drawing is one embodiment of this invention. A study of the illustration readily reveals that the conventional fuel cell can easily be converted into the fuel cell of this invention operable with hydrogen sulfide as its fuel by addition of an absorption reaction column adapted to permit the oxidized negative electrolyte to be reduced by contact with hydrogen sulfide and means adapted to recover the formed sulfur. In this respect, the present invention proves to be highly economical.

In the case of a fuel cell having an electromotive force of 0.7 volt and using an aqueous acetic acid-sodium acetate solution containing an iron-edta chelate compound as the redox solution, the output of the fuel cell operated by feeding hydrogen sulfide at a rate of 200 tons/day is about 10,000 KW. This operation results in recovery of about 180 tons/day of sulfur.

As described above, the fuel cell of the present invention realizes economic utilization of hydrogen sulfide, a potential source of air pollution, as a fuel and provides effective removal of this noxious compound in the form of harmless elementary sulfur, by using positive and negative electrolytes instead of gaseous reactants generally adopted in the conventional fuel cells and utilizing the changes between the oxidized and reduced states of a redox compound brought about by placing the redox compound in the negative electrolyte. The fuel cell enjoys ample practicability in that its power output is quite sufficient for a power generation unit.

Now, the present invention will be described specifically below with reference to working examples.

EXAMPLE 1

To a seven-stage absorption reaction column using, as the redox solution, an aqueous solution containing iron chloride in a concentration of about 2 mol/liter, hydrogen sulfide gas diluted to 10% with nitrogen gas was fed at a rate of 30 liters/min. via the base of the absorption reaction column. Inside the column, the dilute hydrogen sulfide gas was brought into counterflow contact with the redox solution which was fed at a rate of about 0.2 liters/min. And the absorption ratio of hydrogen sulfide was above 99%. When the aqueous iron chloride solution which had been reduced by contact with hydrogen sulfide was passed through a filter of 300 mesh, sulfur was recovered at a rate of about 5 g/min. The redox solution which had been freed from elementary sulfur was fed into a negative electrode chamber of an electrolytic cell having a total negative electrode area of 1.7 m$^2$ and using a cation-exchange membrane as the diaphragm, a Teflon-bonded carbon electrode containing a platinum catalyst as the positive electrode, a carbon cloth as the negative electrode and an aqueous calcium chloride solution as the positive electrolyte. Through the upper portion of the negative electrode chamber, the redox solution was withdrawn and circulated to the aforementioned absorption reaction column. When the redox solution was circulated at 60° C. under the conditions described above, the fuel cell showed an open-circuit voltage of 0.5 volt, an output current density of 25 mA/cm$^2$ and an output voltage of 0.2 volt.

EXAMPLE 2

The same fuel cell as used in Example 1 was operated under the same conditions except that an acid aqueous sulfuric acid solution containing iron sulfate in a concentration of 0.5 mol/liter was used as the redox solution. In this operation, the absorption ratio of hydrogen sulfide was about 74% and the open-circuit voltage was about 0.45 volt.

EXAMPLE 3

The absorption reaction of hydrogen sulfide and the circulation to the negative electrode chamber were carried out by following the procedure of Example 1, except that an aqueous acetic acid-sodium acetate solution (pH 3.5) containing an iron-ethylenediaminetetraacetate chelate compound in a concentration of 0.5 mol/liter was used as the redox solution. In this operation, the absorption ratio of hydrogen sulfide was about 92%, the open-circuit voltage was 0.9 volt, the output current density was 10 mA/cm$^2$ and the output voltage was 0.7 volt. When the operation was repeated by using an iron-nitrilotriacetate chelate compound, the results were substantially the same as those described above.

What is claimed is:

1. A fuel cell, comprising an electrolytic cell, a diaphragm separating the interior of the electrolytic cell into a positive electrode chamber and a negative electrode chamber, a negative electrode disposed within said negative electrode chamber, a redox solution filling said negative electrode chamber, the redox solution producing elementary sulfide by reacting with hydrogen sulfide and being regenerated by oxidation on the negative electrode, means for withdrawing from the negative electrode chamber the redox solution in an oxidized state, means for bringing the oxidized redox solution into contact with hydrogen sulfide so as to reduce the redox solution and, at the same time, produce the elementary sulfur in the solution, means for removing the formed elementary sulfur from the reduced redox solution, and means for recycling to the negative electrode chamber the reduced redox solution.

2. The fuel cell according to claim 1, wherein said redox solution is an aqueous solution containing an iron compound.

3. The fuel cell according to claim 2, wherein the iron compound is selected from the group consisting of iron chloride, iron-ethylenediaminetetraacetate and iron-nitrotriacetate.

4. The fuel cell according to claim 1, wherein said redox solution is an aqueous solution containing iron chloride in a concentration of 1 to 3 mol/liter.

5. The fuel cell according to claim 1, wherein said redox solution is an aqueous solution containing iron-ethylenediaminetetraacetate in a concentration of 0.3 to 1 mol/liter.

6. The fuel cell according to claim 1, wherein said redox solution is an aqueous solution containing iron-nitrilotriacetate in a concentration of 0.3 to 1 mol/liter.

* * * * *